May 31, 1960   P. KLINGENSTEIN   2,938,441
CAMERA CARRYING CASE WITH CHART SELECTOR
Filed April 22, 1958
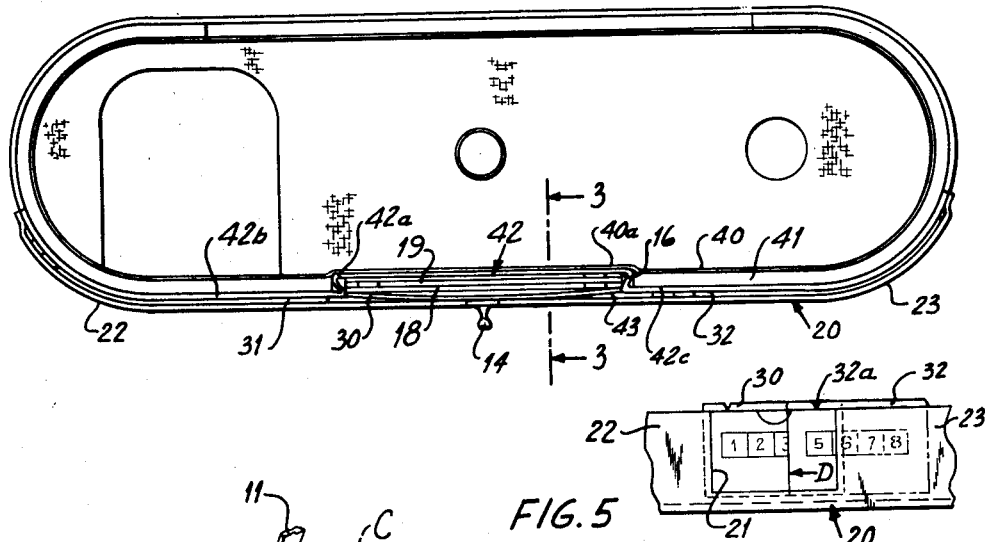
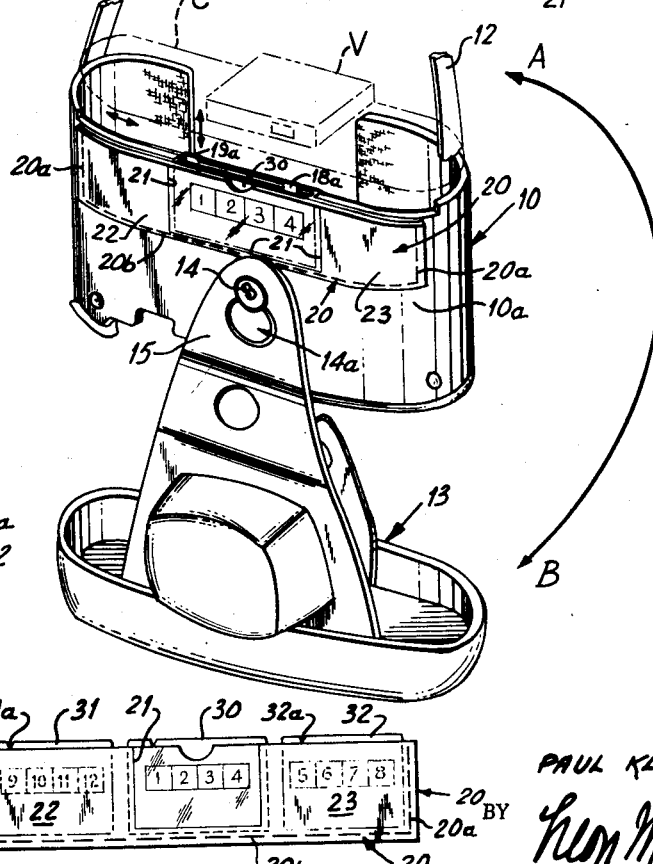
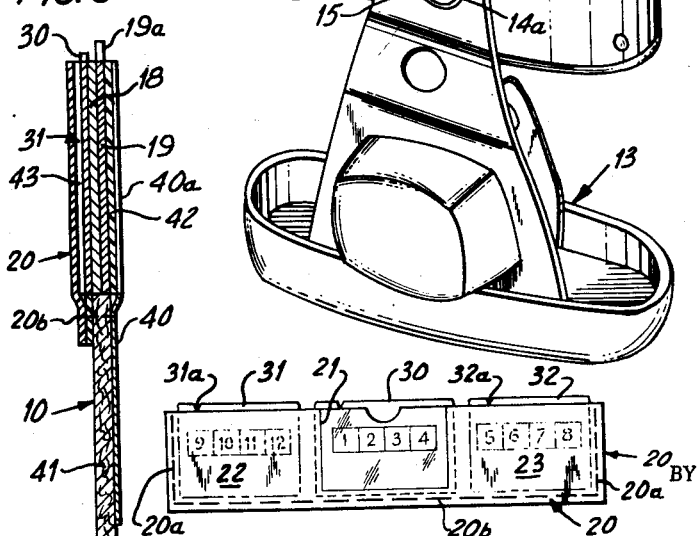
INVENTOR.
PAUL KLINGENSTEIN
BY

2,938,441
CAMERA CARRYING CASE WITH CHART SELECTOR

Paul Klingenstein, 257 4th Ave., New York 10, N.Y.

Filed Apr. 22, 1958, Ser. No. 730,073

3 Claims. (Cl. 95—11)

This invention relates to camera carrying cases and more particularly to a case into which a camera is fitted and to which frontal and top cover parts are hinged or linked. Thus the camera may be immediately readied for operation upon movement of said camera case parts from an operative or closing position to an inoperative position, in which said case is open but remains still attached to the camera.

It is one of the objects of the present invention to provide means facilitating the disposition of one or more exposure charts adjacent the camera, when the aforesaid camera case parts are moved or swung to an open position, so that a camera operator when subsequently manipulating or seting the camera for snapshots will have always accessible for viewing and study a chart pertaining to conditions for picture taking.

It is another object of the present invention to provide means affording easy interchangeability of color picture charts in accordance with various prevailing operational conditions when taking color picture, such as light sensitivity of film, color filter characteristics, scenery, etc.

A further object of the present invention resides in the provision of means contributing to a most efficacious camera operation by the use of a selector device for color picture taking, which device is composed of a plurality of carriers or charts, which may be placed in operative position in a very efficient and highly economical manner for reading and viewing by an operator and may be subsequently withdrawn or slid into inoperative position, if desired.

Yet another object of the present invention resides in the provision of means conducive to a simplified selector device for use in connection with color picture taking which may be attached or built in camera carrying cases without changing the sturdiness and cost of manufacture of such cases in any substantial manner.

In the drawing:

Fig. 1 is a top plan view of a camera carrying case embodying the invention and drawn on an enlarged scale;

Fig. 2 is a perspective view of the carrying case of Fig. 1, shown on a reduced scale, the case being in open position with the swingable cover depending from the latter;

Fig. 3 is an enlarged cross-sectional view taken along lines 3—3 of Fig. 1;

Fig. 4 shows a front elevational view of a carrier of charts attached to the rear wall of the camera case.

Fig. 5 is a fragmentary view similar to that of Fig. 4 indicating the displacement of one of the lateral charts relative to the central chart.

Referring now more particularly to the drawing, there is shown a carrying case 10 having the straps 11 and 12 and a swingable cover 13 of known construction which is coupled by means of a stud 14 and opening 14a to flap 15 of cover 13. This cover 13 may be swung around according to arrow A to overlie camera housing C when fitted in case 10 which has a viewer V (indicated in phantom lines.)

It has been found in color-photography that when pictures are to be taken and after cover 13 has been swung open in the direction of arrow B, the necessity often arises to work with or have a color chart handy which in view of various atmospheric conditions discloses exposure values according to the film type used in the camera. Such charts are well known and now on the market.

The present invention contemplates to incorporate a plurality of different color charts in the carrying case 10 and at a position thereof which generally faces the eyes of the operator when he is operating the viewer V of the camera.

According to the present invention the standard carrying case is provided with a cutout at 16 for the accommodation therein of a plurality of charts as 18 and 19 in stacked relation. These charts may have, if desired, tabs 18a and 19a to facilitate insertion and removal of said charts 18 and 19 relative to the central cutout or window 16. Overlying cutout 16 is a chart carrier unit 20 which is stitched to the leather case along stitch-lines 20a and 20b. Chart-supporting unit 20 is sub-divided in three sections, a middle or central section 21 and two outer or lateral sections 22 and 23. Each of these sections forms a pocket in which charts 30, 31 and 32 are inserted as can be more clearly seen from Figs. 2, 4 and 5. Only the chart 31 in middle section 21 is fixed in position and is arranged behind transparent wall made of cellophane or other plastic material, whereas the lateral sections 22 and 23 are preferably made from the same material which is, however, opaque or not as transparent as the center pocket or section 21. It will be seen and easily understood that chart 32 may be readily slid in front of central chart 30 by inserting the nail of a finger of a hand of an operator into notch 32a to facilitate sliding this chart in the direction of arrow D over central or middle chart 30 which is retained in fixed position (Fig. 5) and thus covers up the latter.

Lateral chart 31 has likewise a notch 31a which permits, after retraction of chart 32 from its middle position in which it overlies chart 30, to be moved in the same manner in position in front of chart 30.

According to the invention some charts may be moved laterally with respect to each other, but other charts may be stacked successively in the cut-out or window 16. In the latter case the charts are movable in upward and downward directions in said window, as hereinabove explained.

Figs. 1 and 3 show an inner felt layer 40 forming a lining for leather wall 41. Window 16 comprising a lengthy celluloid or like strip 42 is U-shaped at 42a and abuts against felt lining 40 at 40a. The U-shaped space thus formed accommodates charts 19 and 18 as well as chart 30, the latter somewhat bulging outwardly at the median portion thereof. The lateral ends 42b and 42c of strip 42 together with the sections 21, 22, 23 of front strip 20 are stitched at 20a, 20b to the outer face 10a of the leather wall 41 of case 10 in such manner as to leave a slide space 43 between strip sections 42b, 42c and 22, 23 so that charts 31, 32 may be slid along said space 43 as hereinabove explained.

If chart 30 is removed from middle section 21 then first chart 18 is exposed to view thereat and if then chart 18 is withdrawn (by means of tab 18a or the like) from cut-out or window 16 then chart 19 will be brought into action and may be viewed through transparent section 21.

It is well understood that charts 31 and 32 may replace charts 18 and 19 and that the latter may be inserted into the pockets in which charts 31 and 32 are inserted for lateral sliding movements relative to the central chart. If central chart 30 is removed then automatically chart 18 is exposed to view and such chart may then cooperate in a manner as heretofore explained with lateral charts 31, 32, as the case may be.

It is further possible to dispense with the lateral charts completely and to leave out the lateral extensions 22 and 23 if certain circumstances may require such changed structure.

As an example, each of the aforesaid charts may be printed on the front face as well as the rear face with different data. One of the charts may, for instance, disclose at one side the type of the film used, such as panatomic or like film and indicate the exposure values for bright sun and snow, for hazy sun, for cloudy and bright sun and for shade to which atmospheric conditions respective exposure values may increase from say 12.5 to 8.5. The reverse side of such chart may indicate, for instance, the respective shutter speed for the type of film used and the conditions depending upon the distance from the object; further the exposure values, when certain types of bulb reflectors are used.

From the aforesaid disclosure it will become readily apparent that the selector device is not only applicable to color photography but also for any other type of films used for the camera and for which the respective chart is prepared.

It can thus be seen that there has been provided in accordance with the present invention a selected device for charts with exposure values, in particular for use in color photography, which device is disposed at and incorporated in a carrying case for the camera, which has a rear wall and a closure wall hinged to the case and adapted in open position to uncover the lens and viewer of the camera, a window being disposed at the upper end of the rear wall and transparent carrier means for the charts are connected thereat and located at said window for the insertion of a plurality of chart means. At least one of said chart means is adapted for location and exposure in said window to be viewed through the transparent carrier by an operator when setting camera lens condition for taking pictures. Said closure being swingable to closed position to overlie said camera lens and viewer as well as said carrier at said window.

It is further well understood that the selected device according to the invention may be readily incorporated in existing camera carrying cases without any difficulties by providing a cut-out in the carrying case at the upper rear end thereof.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A chart selector device, in particular for color photography comprising in combination a carrying case having a rear wall, a closure hinged to said case and adapted in open position to uncover the lens of a camera when received in said case, a window assembly disposed at the rear wall of said case and including a cut out in the rear wall, transparent holder means supported by said case and extending into said cut out, and chart means received by said holder means, at least one of said chart means being adapted for location in said cut out to be exposed to view through said holder means thereby to aid an operator in setting camera operation conditions when taking pictures, said closure being swingable to closed position to cover said camera and said chart means at said window assembly.

2. A selector device for use in color photography comprising a carrying case for a camera, said case having a rear wall, a closure wall hinged to said case and adapted in open position to uncover the lens and viewer of said camera, a window disposed at the upper end of said rear wall, transparent carrier means connected to said case and located at said window, and a plurality of chart means placed in said carrier means, at least one of said chart means being adapted for location and exposure in said window to be viewed through said transparent carrier means by an operator when setting camera lens condition for taking pictures, said closure being swingable to closed position to overlie said camera lens and viewer together with said carrier for said chart means at said window.

3. A selector device for holding charts for use in photography; comprising a camera carrying case having a rear wall, a frontal closure wall hinged to said case and adapted in open position to uncover the front of said camera, a cut-out forming a window and disposed at the upper end of said rear wall, and transparent means located at said cut-out and providing a transparent wall for closing said window, said window being adapted to hold a plurality of chart means, at least one of said chart means being exposed to view in said window to be viewed through said transparent means by an operator when setting camera lens condition for taking a picture, said closure being swingable to closed position to overlie the front of said camera and extending toward said transparent means at said window to cover the latter.

References Cited in the file of this patent

FOREIGN PATENTS 712,454    Great Britain _____ July 21, 1954